United States Patent
Li et al.

(10) Patent No.: US 8,381,984 B2
(45) Date of Patent: Feb. 26, 2013

(54) SYSTEM OPERATIVE FOR PROCESSING FRAME HAVING REPRESENTATION OF SUBSTRATE

(75) Inventors: Jingquan Li, Auburn, NY (US);
Timothy P. Meier, Camillus, NY (US);
Robert M. Hussey, Waxhaw, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 275 days.

(21) Appl. No.: 12/751,560

(22) Filed: Mar. 31, 2010

(65) Prior Publication Data
US 2011/0240742 A1 Oct. 6, 2011

(51) Int. Cl.
*G06K 7/10* (2006.01)
(52) U.S. Cl. .............................. 235/462.11; 235/462.24
(58) Field of Classification Search ............ 235/462.11, 235/462.08, 462.1, 462.24, 462.41
See application file for complete search history.

(56) References Cited

U.S. PATENT DOCUMENTS

| | | | |
|---|---|---|---|
| 4,588,211 A | 5/1986 | Greene | |
| 4,776,464 A | 10/1988 | Miller et al. | |
| 4,832,204 A | 5/1989 | Handy et al. | |
| 5,119,433 A | 6/1992 | Will | |
| 5,120,940 A | 6/1992 | Willsie | |
| 5,138,140 A | 8/1992 | Siemiatkowski et al. | |
| 5,199,084 A | 3/1993 | Kishi et al. | |
| 5,262,623 A | 11/1993 | Batterman et al. | |
| 5,307,423 A | 4/1994 | Gupta et al. | |
| 5,317,388 A | 5/1994 | Surka et al. | |
| 5,331,151 A | 7/1994 | Cochran et al. | |
| 5,410,141 A | 4/1995 | Koenck et al. | |
| 5,413,383 A | 5/1995 | Laurash et al. | |
| 5,428,212 A | 6/1995 | Tani et al. | |
| 5,471,533 A | 11/1995 | Wang et al. | |
| 5,490,217 A | 2/1996 | Wang et al. | |
| 5,500,516 A | 3/1996 | Durbin | |
| 5,506,697 A | 4/1996 | Li et al. | |
| 5,617,481 A | 4/1997 | Nakamura | |
| 5,659,167 A | 8/1997 | Wang et al. | |
| 5,857,029 A | 1/1999 | Patel | |
| 6,129,278 A | 10/2000 | Wang et al. | |
| 6,390,362 B1 | 5/2002 | Martin | |
| 6,561,428 B2 | 5/2003 | Meier et al. | |
| 6,722,569 B2 | 4/2004 | Ehrhart et al. | |
| 6,834,807 B2 | 12/2004 | Ehrhart et al. | |
| 8,079,524 B2 * | 12/2011 | He et al. ................... | 235/462.41 |
| 8,292,183 B2 | 10/2012 | Li et al. | |
| 8,297,511 B2 | 10/2012 | Hawley et al. | |
| 8,308,069 B2 | 11/2012 | Barber et al. | |
| 2002/0110283 A1 | 8/2002 | Fan et al. | |
| 2002/0128796 A1 | 9/2002 | Matsutani | |

(Continued)

*Primary Examiner* — Karl D Frech
(74) *Attorney, Agent, or Firm* — Heslin Rothenberg Farley & Mesiti P.C.

(57) ABSTRACT

A system having an image sensor array can be provided for use in locating and decoding a bar code symbol represented within a frame of image data. An image sensor array can be incorporated in a terminal having a hand held housing. A terminal can be operative to capture a frame and locate a feature of a document represented within the frame, the document of a type having a bar code symbol at a predetermined location. The system can determine a location of a bar code symbol representation within an image representation. For determining a location of the bar code symbol representation in an image representation, the system can be operative to utilize pre-stored information respecting the document and the determined location of the document feature representation, the pre-stored information indicating a location of the bar code symbol in a document of the document type subject to image capture.

17 Claims, 8 Drawing Sheets

U.S. PATENT DOCUMENTS

| | | |
|---|---|---|
| 2003/0034463 A1 | 2/2003 | Tullis |
| 2004/0155110 A1 | 8/2004 | Ehrhart et al. |
| 2006/0071081 A1 | 4/2006 | Wang |
| 2009/0022429 A1 | 1/2009 | Longacre, Jr. et al. |
| 2011/0240740 A1 | 10/2011 | Li et al. |
| 2011/0240741 A1 | 10/2011 | Li et al. |

* cited by examiner

SYSTEM OPERATIVE FOR PROCESSING FRAME HAVING REPRESENTATION OF SUBSTRATE

FIELD OF THE INVENTION

The present invention relates to registers in general and in particular to a terminal having an image sensor array.

BACKGROUND OF THE PRIOR ART

Terminals having image sensor arrays are known for use in decoding of bar codes and output of decoded messages. Image sensor arrays are becoming available in forms having increasing numbers of pixels.

The availability of higher density image sensor arrays having an increased number of pixels, while providing certain advantages, can also present challenges. With image sensor arrays having increasing numbers of pixels, frames of image data captured with use of such terminals have increasing numbers of pixel values. While a greater number of pixel values generally means an image representation with a higher resolution, the higher resolution can result in increased processing delays associated with locating of features represented within a frame.

SUMMARY OF THE INVENTION

A system having an image sensor array can be provided for use in decoding a bar code symbol represented in a frame of image data. An image sensor array can be incorporated in a terminal having a hand held housing. In one embodiment, a system can be provided by a terminal. In one embodiment, a system can be provided by a terminal in combination with one or more external servers.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

A system having an image sensor array can be provided for use in locating and decoding a bar code symbol represented within a frame of image data. An image sensor array can be incorporated in a terminal having a hand held housing. A system can be operative to capture a frame and locate a feature of a document represented within the frame, the document of a type having a bar code symbol at a predetermined location. The system can determine a location of a bar code symbol representation within an image representation. For determining a location of the bar code symbol representation in an image representation, the system can be operative to utilize pre-stored information respecting the document and the determined location of the document feature representation, the pre-stored information indicating a location of the bar code symbol in a document of the document type subject to image capture. A system as set forth herein can also be utilized to locate features of image representations representing substrates other than documents.

Figure 1:
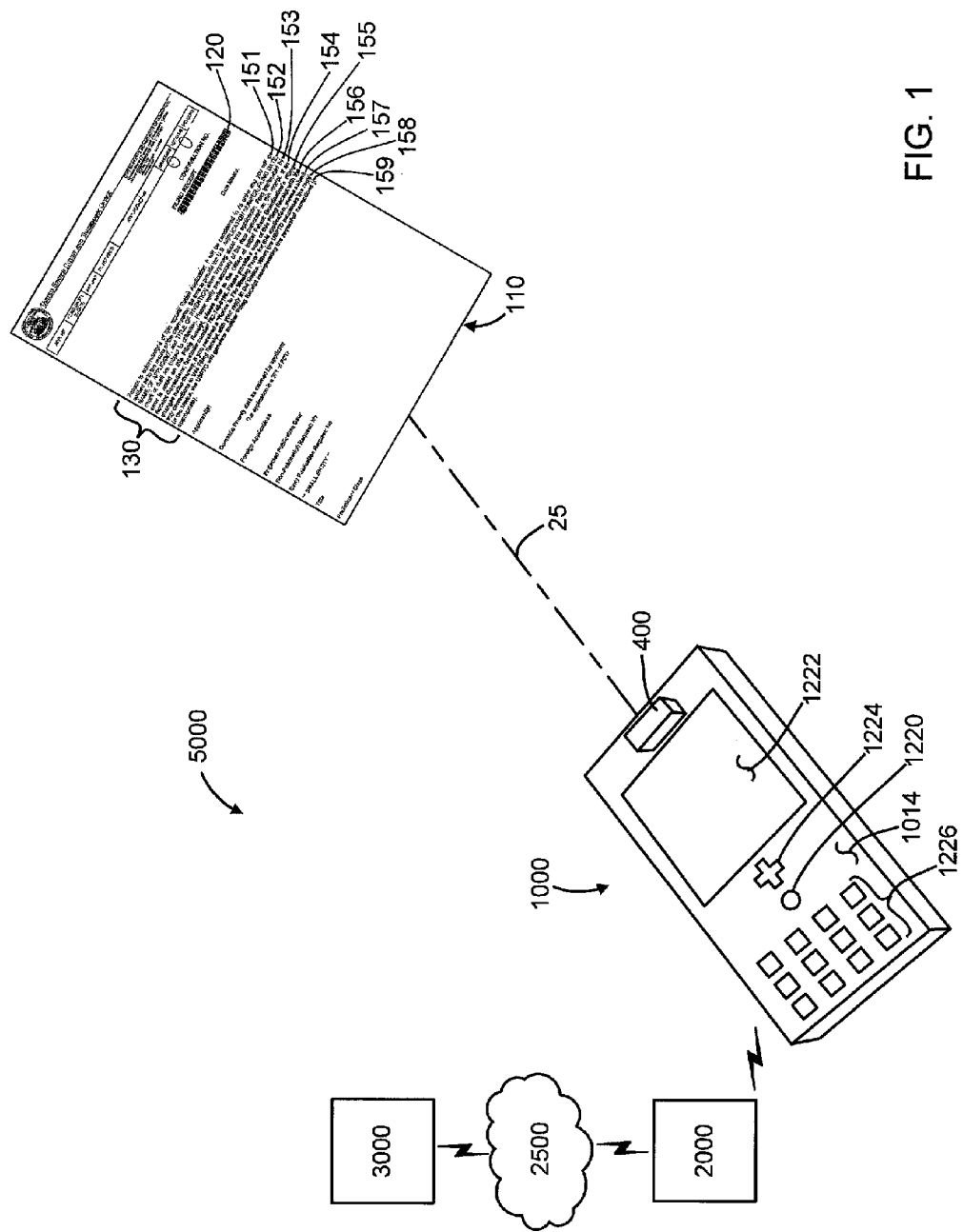
FIG. 1 is a schematic diagram of a system including a terminal that includes an image sensor array.

In FIG. 1, there is shown an imaging system 5000 having a terminal 1000, a local server 2000, and a remote server 3000 coupled to local server 2000 through a network 2500. Imaging system 5000 can be utilized for processing a frame of image data captured with the use of terminal 1000.

Figure 2:
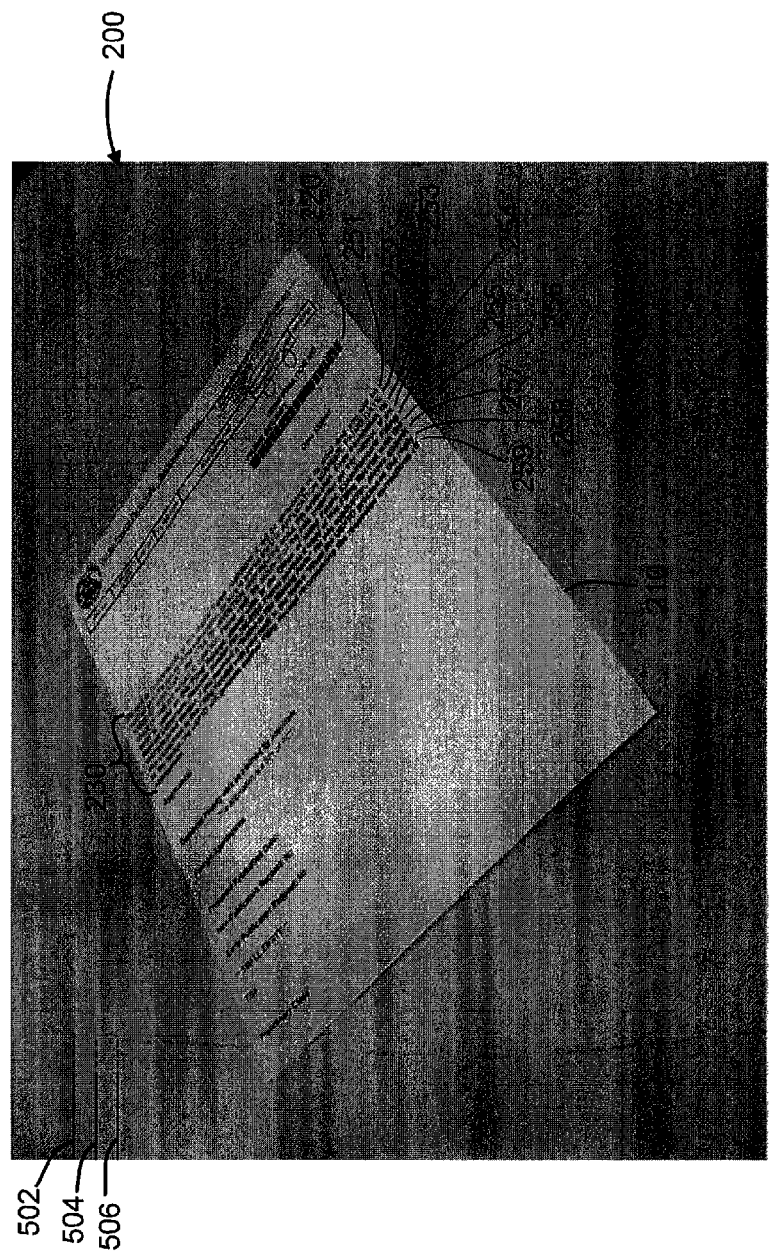
FIG. 2 illustrates a frame of image data that can be captured with a terminal.

Referring to FIG. 2, there is depicted a frame of image data 200 (frame) having a document representation 210, of document 110 from FIG. 1. Frame 200 can be captured utilizing terminal 1000. As the document 110 represented within frame 200 depicted in FIG. 2 comprises decodable indicia provided by a bar code symbol 120, the document representation 210 can include a bar code symbol representation 220. Referring to frame 200, the document representation 210 of frame 200 is rotated relative to a normal orientation and includes distortion as is indicated by parallel linear features of document 110 (e.g., the left and right edges of document 110) being represented by corresponding non-parallel features in the frame 200. Frame 200 can be captured with use of a terminal 1000 as depicted in FIG. 1. Distortion of frame 200 can result from terminal 1000 being positioned at a non-perpendicular angle relative to a real document 110 or other substrate during image capture as is depicted in FIG. 1. Terminal 1000 can be at a non-perpendicular angle relative to a real document 110 or other substrate when imaging axis 25 of terminal 1000 is at a non-perpendicular angle relative to a real document 110 or other substrate during image capture.

Figure 3:
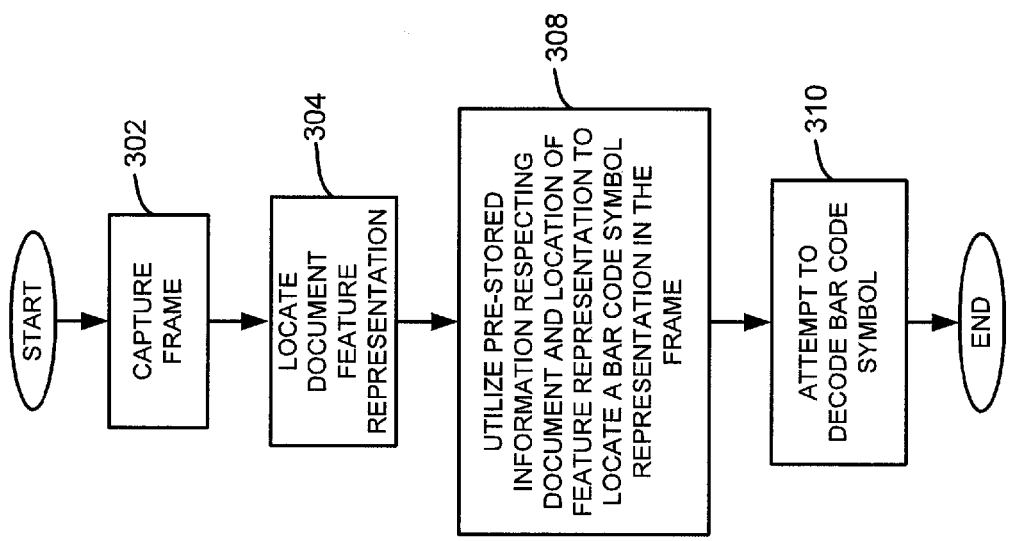
FIG. 3. is a flow diagram that illustrates a method that can be carried out by a system.

Referring to FIG. 3, there is shown a flow diagram illustrating a method wherein a frame of image data as characterized in FIG. 2 can be processed. The method of the flow diagram as shown in FIG. 3 can be carried out utilizing a system 5000 having an image sensor array 1033 as will be set forth herein with reference to FIG. 7. In one aspect, terminal 1000 can utilize pre-stored information respecting a document for locating a bar code symbol representation in a frame. The pre-stored information can be stored in a memory of system 5000 and can be information respecting a position of a bar code symbol in document of a predetermined type.

At block 302, a frame can be captured. A capture of a frame 200 can occur responsively to a trigger signal being activated as will be described herein. Frame 200 can be a captured frame of a captured succession of frames captured by terminal 1000. At block 304, system 5000 can locate a document feature representation within the frame. Such feature representation can be, e.g., a representation of one or more edges of a document, corners of a document, text block(s) of a document, logos of a document, straight line segments of a document. At block 308, system 5000 can utilize pre-stored information respecting a document of the type represented by frame 200 and the location of the feature representation determined at block 304 within the frame to locate a bar code symbol representation in the frame. "The frame" as referred to in block 308 and in other post capture steps herein can be, e.g., verbatim, the frame captured at block 302, a processed version of the frame captured at block 302, or a frame reasonably estimating the content of the frame captured at block 302, e.g., a frame captured by terminal 1000 proximate in time to the frame captured at block 302.

At block 310, system 5000 can attempt to decode a bar code symbol utilizing the bar code symbol representation located at block 308. Subsequent to the locating of the document feature representation at block 304, system 5000 can perform processing steps in addition to the processing to locate a bar code symbol representation 220 and the processing to attempt to decode a bar code symbol. For example, system 5000 can transform a representation of a document e.g., document representation 210, to generate a transformed image representation with orientation and distortion corrected. A transformed frame can be a frame with orientation corrected but not distributed. A transformed frame can be a frame with distortion corrected but not orientation. A transformed frame can be cropped or uncropped.

Relative to an alternative method wherein a location of a bar code symbol representation is determined prior to or without locating a document representation, the method set forth herein can significantly reduce read time. By the described method a location of a bar code symbol representation within a document representation can be determined quickly after a location of a document feature representation is determined without examination of image data, which in the case of an image sensor array having an increased number of pixels can be expected to consume an increased amount of time. The method can be particularly advantageous in the case of a capture of a large frame of image data in which the pixel values representing a bar code symbol represent only a small portion of an entire frame.

Figure 4:
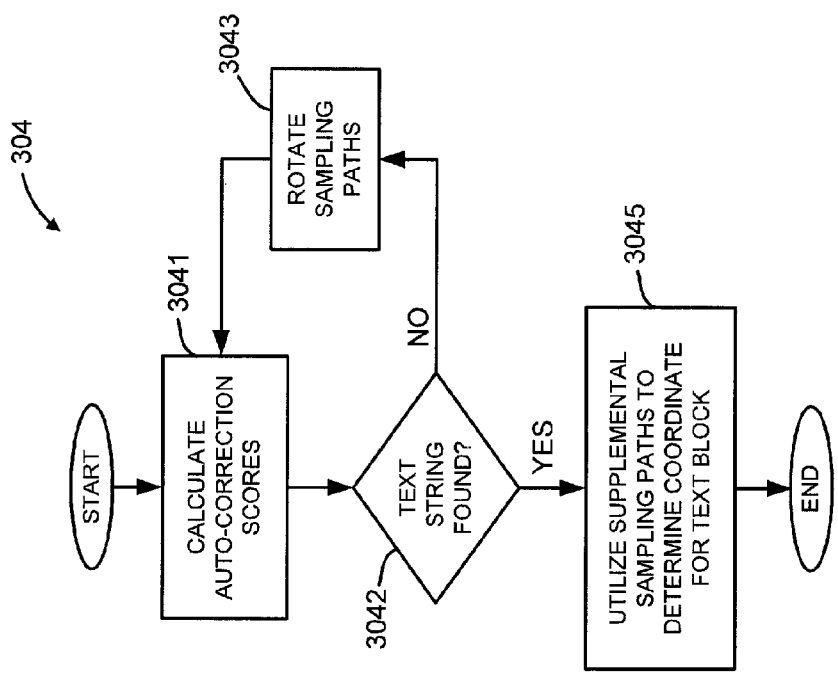
FIG. 4 is a flow diagram that illustrates a method that can be carried out by a system.

Steps of the described processing at block 304 (locate document feature representation) in an exemplary embodiment are now described in further detail. An exemplary process for attempting to locate a document feature representation in a frame is described with reference to the flow diagram of FIG. 4. At block 3041, system 5000 can calculate autocorrelation scores along various parallel line sampling paths of frame 200.

Autocorrelation scores for each path can be determined according to the formula:

$$S \text{ path} = \Sigma(I_n - I_{n-1})^2 \qquad \text{Equation 1}$$

where $I_n$ is the pixel value at a certain pixel position n, of a path, and $I_{n-1}$ is a pixel value at a pixel position adjacent to the nth pixel position. For reduction of clock cycles required for performing the calculation of Equation 1, an approximation of the result of Equation 1 can be carried out by executing the calculation:

$$S \text{ path} = \Sigma |I_n - I_{n-1}| \qquad \text{Equation 2}$$

Representative parallel sampling paths 502, 504, 506 are shown in FIG. 2. While only three sampling paths 502, 504, 506 are shown in FIG. 2, the sampling paths can be extended throughout a frame 200. An auto-correlation score above a threshold can indicate whether the sampling path intersects a representation of a text string 251, 252, 253, 254, 255, 256, 257, 258, 259. The document representation of FIG. 2 has a plurality of text string representations, 251, 252, 253, 254, 255, 256, 257, 258, 259 corresponding to text strings 151, 152, 153, 154, 155, 156, 157, 158, 159 of real document 110 as shown in FIG. 1. Sampling paths that intersect a text string representation by virtue of their having numerous transitions between high and low values will have relatively high auto-correlation scores. When terminal 1000 searches for text string representations, terminal 1000 can utilize low resolution sampling paths including e.g., every other pixel value or every Nth pixel along the path. Utilizing low resolution sampling paths, locating speed is improved. If no text strings are located utilizing a first set of sampling paths through a frame, sampling paths 502, 504, 506 can be rotated incrementally (block 3043) until an auto-correlation score indicating a text string representation is achieved.

In another example of a processing at block 304 (locate document feature representation), system 5000 can locate corners and/or edges of a document representation. For such locating, system 5000 can examine image data to determine a presence of contrast changes defining corners and edges. Methods for determining a location of corners and of edges of a document representation, and numerous additional method and apparatus elements, are described in U.S. application Ser. No. 12/751,493 filed on the filing date of the present application. The entirety of method and apparatus elements described in U.S. application Ser. No. 12/751,493 can be incorporated in system 5000. U.S. application Ser. No. 12/751,493 is incorporated herein by reference.

In another aspect, system 5000 can include pre-stored information respecting document 110 where document 110 is of a predetermined type. Exemplary pre-stored information of a document of the type shown in FIG. 1 and a representation of which is shown in FIG. 2 is summarized in Table A. The pre-stored information can include document dimensions, text block offset and dimensions and bar code symbol offset and dimensions.

TABLE A

|  | OFFSET | DIMENSIONS | TEXT STRINGS |
| --- | --- | --- | --- |
| DOCUMENT | **** | 21.5 cm × 28.0 cm | **** |
| TEXT BLOCK | 0.5 cm × 9.5 cm | 20.0 cm × 4.0 cm | 9 (20.0 cm) |
| BAR CODE SYMBOL | 13.5 cm × 5.5 cm | 7.0 cm × 1 cm | **** |

The pre-stored information respecting a document can include the dimensions of a known document type, information respecting number of text strings, and the dimensions and offset of a text box 130. The pre-stored information can be determined manually, e.g., by manually measuring dimensions and offsets for features of a document.

In another embodiment, the pre-stored information can be determined automatically by examination of captured frames of image data. A system in which pre-stored information can be determined automatically by examination of one or more captured frames, as well as numerous additional method and apparatus elements which can be incorporated in system 5000, are described in U.S. application Ser. No. 12/751,430 filed on the filing date of the present application. The entirety of method and apparatus elements described in U.S. application Ser. No. 12/751,430 can be incorporated in system 5000. U.S. application Ser. No. 12/751,430 is incorporated herein by reference.

In the document 110 of a known document type, there are nine (9) text strings 151-159 extending substantially the full width of document 110. Once the first text string of a document representation 210 is located with use of a certain sampling path (block 3042), supplemental sampling paths (block 3045) can be utilized in parallel arrangement to the certain sampling path until the number of text strings is determined.

In one embodiment, such supplemental sampling paths can be of a higher resolution and can be more closely spaced than sampling paths 502, 504, 506. The supplemental sampling paths can be subject to additional examination so that a beginning and end coordinate location of each text string representation can be determined.

Figure 5:
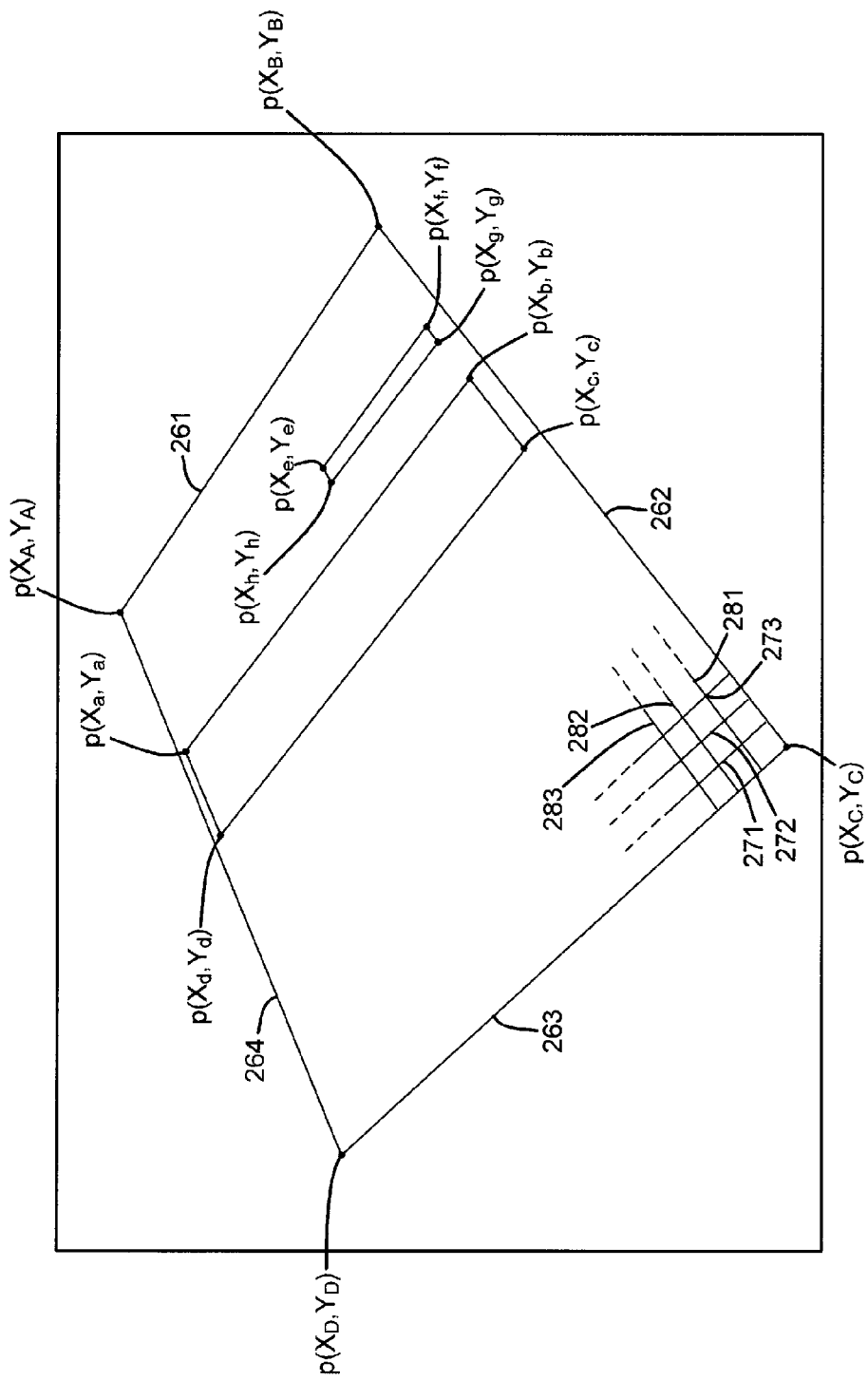
FIG. 5 is a diagram illustrating a transformation method that can be carried out by a system.

A document type can be determined based on the number and characteristics of text strings located. In addition to having the pre-stored information of a first document type as shown in Table A, a memory of system 5000 can have pre-stored information corresponding to additional document types. System 5000 can be operative to discriminate between document types. With a document feature represented (e.g., text block in the described example) located, the pre-stored information respecting the document can be utilized to locate other features of the document representation. Referring to the pixel position map of FIG. 5, by examination of sampling paths adjacent the certain sampling path, pixel coordinate locations $p(x_a, y_a)$; $p(x_b, y_b)$; $p(x_c, y_c)$; $p(x_d, y_d)$ of frame 200 designating the boundaries of text box representation 230 can be determined Utilizing the coordinate location for text box representation 230 and pre-stored information relative to document 110 determined to be of a known type, system 5000 can determine pixel coordinate locations $p(x_e, y_e)$; $p(x_f, y_f)$; $p(x_g, y_g)$; $p(x_h, y_h)$ for bar code symbol representation 220 by application of simple geometry to translate features of a known document to pixel coordinate positions of frame 200. Processing by system 5000 to determine the coordinate locations for bar code symbol representation 220 can comprise utilizing the determined location of a document feature representation and the pre-stored information. System 5000 can also apply simple geometry utilizing the determined location of a document feature representation and the pre-stored information to determine the coordinate locations for document representation 210, i.e., coordinate locations $p(x_A, y_A)$; $p(x_B, y_B)$; $p(x_C, y_C)$; $p(x_D, y_D)$.

Referring further to block 308, system 5000 can utilize pre-stored information respecting the document and the location of the document feature representation determined at block 304 to locate a bar code symbol representation in the frame. "The frame" referred to in block 308 and in other post capture steps can be, e.g., verbatim the frame captured at block 302, a processed version of the frame captured at block 302, a frame reasonably estimating the content of the frame captured at block 302, e.g., a frame captured by terminal 1000 proximate in time the frame capture at block 302, e.g., a succeeding frame of a succession of frames captured representing to activation of a trigger signal. Referring to Table A, the pre-stored information can include a dimension of a bar code location of a document type and the offset of the bar code symbol. Utilizing the location of the document feature representation determined at block 304 and the pre-stored information, system 5000 at block 308 can determine that the pixel coordinate locations of bar code symbol representation in the described example are the pixel coordinate locations $p(x_e, y_e)$; $p(x_f, y_f)$; $p(x_g, y_g)$; $p(x_h, y_h)$.

System 5000 can be operative to utilize the pixel values of image data within the coordinate locations $p(x_e, y_e)$; $p(x_f, y_f)$; $p(x_g, y_g)$; $p(x_h, y_h)$ for attempting to a decode bar code symbol.

Figure 6:
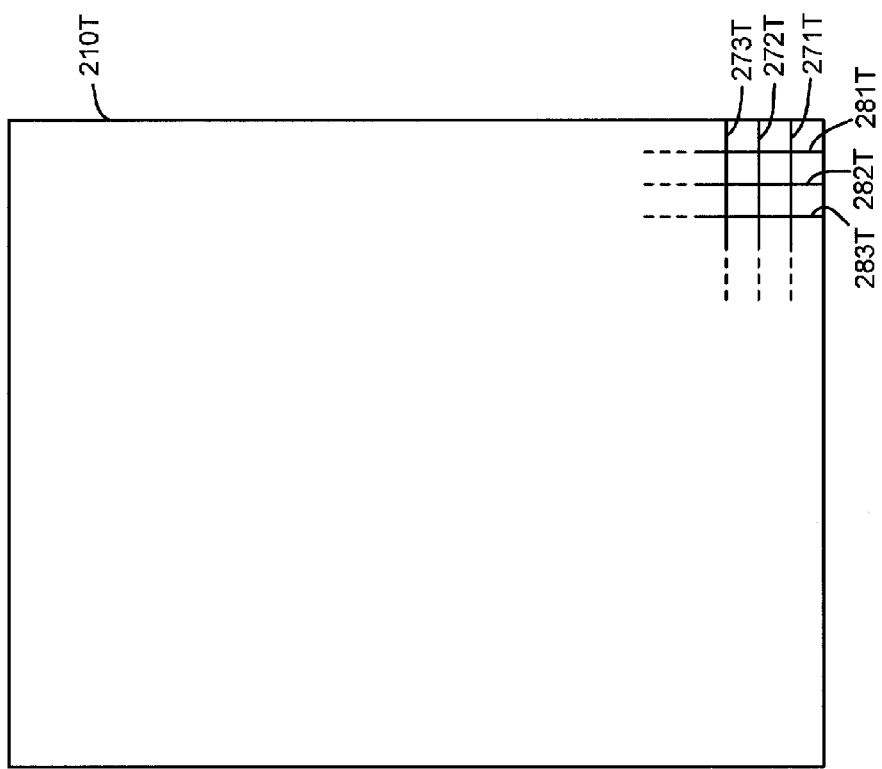
FIG. 6 is a diagram illustrating a transformation method that can be carried out by a system.

In addition to attempting to decode a bar code symbol after execution of block 304, system 5000 can perform further processing. For example, system 5000 can subject a frame to transformation processing to output a transformed image representation of a document 110 for storage and/or display. A transformed image representation can correct for distortion and/or orientation error of an originally captured frame. Transformation processing can include one or more of distortion correction, orientation correction, and cropping. For outputting a transformed image representation, system 5000 can crop all pixel values of all pixel positions external to boundary lines 261, 262, 263, 264 connecting document pixel positions $p(x_A, y_A)$; $p(x_B, y_B)$; $p(x_C, y_C)$; $p(x_D, y_D)$. System 5000 further for outputting a transformed image representation can examine data along horizontal grid lines 271, 272, 273 and vertical grid lines 281, 282, 283 and utilizing the sampled grid line data to determine pixel values at corresponding horizontal and longitudinal grid line locations for a transformed image representation 210T as depicted in FIG. 6. Regarding horizontal grid lines 271, 272, 273, horizontal grid lines 271, 272, 273 can be nonparallel in the case of a distorted frame and can connect M equally spaced positions of boundary line 262 and boundary line 264. Regarding vertical grid lines 281, 282, 283, vertical grid lines 281, 282, 283 will be nonparallel in the case of a distorted image and can connect N equally spaced positions of boundary line 261 and boundary line 263. Regarding corresponding horizontal grid lines 271T, 272T, 273T, there can be M parallel grid lines. Regarding corresponding vertical grid lines 281T, 282T, 283T, there can be N vertical grid lines.

Figure 7:
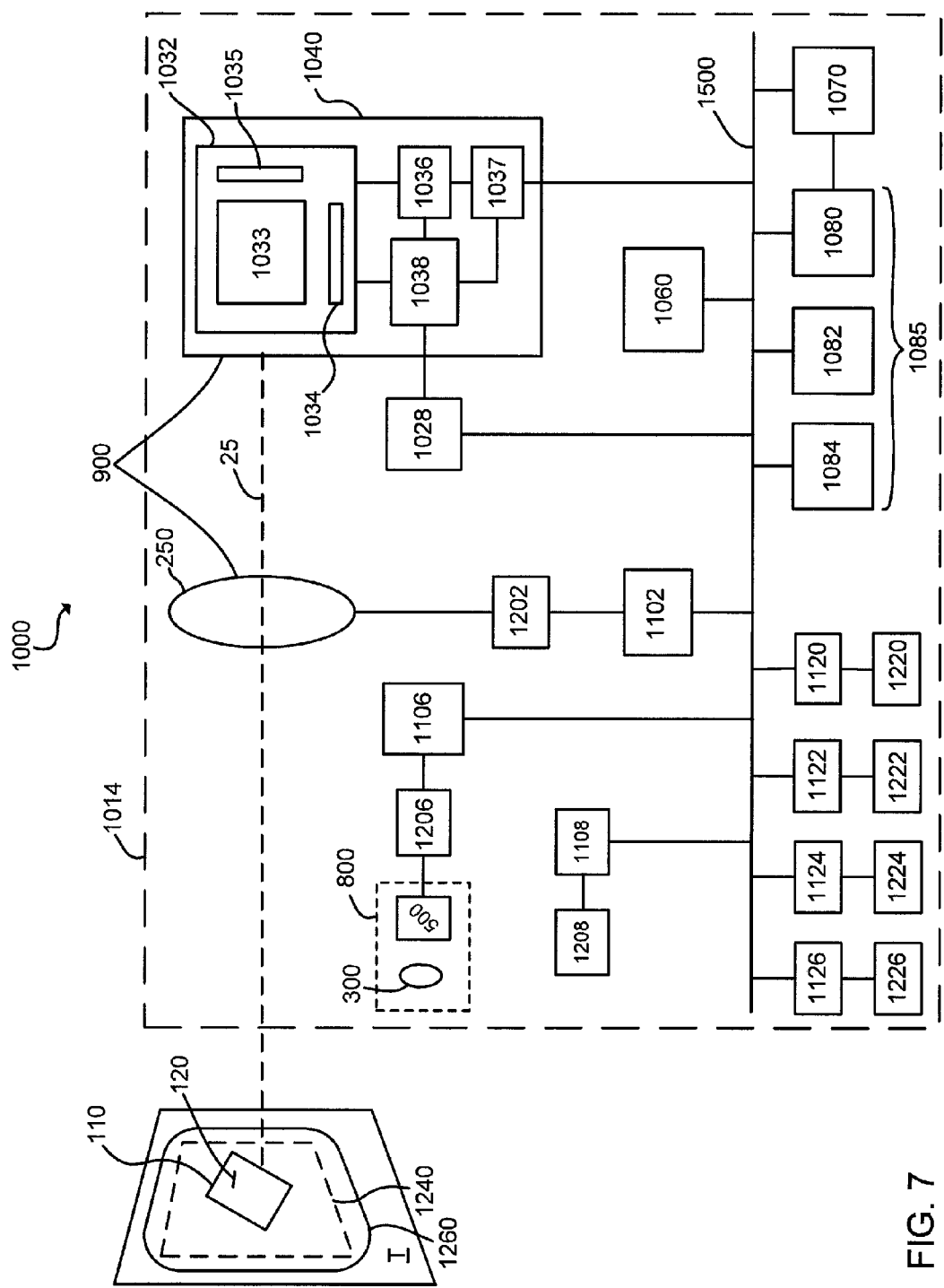
FIG. 7 illustrates a block diagram of computer which can be provided by a terminal having an image sensor array.

An exemplary hardware platform for support of operations described herein with reference to an image sensor based indicia reading terminal is shown and described with reference to FIG. 7.

Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor integrated circuit 1040 can incorporate a Bayer pattern filter, so that defined at the image sensor array are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively prior to subjecting a frame for further processing can interpolate pixel values intermediate of blue pixel positions utilizing blue pixel values.

In the course of operation of terminal 1000, image signals can be read out of image sensor 1032, converted, and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Regarding server 2000 and server 3000, each of server 2000 and server 3000, in the manner of terminal 1000 can include a CPU 1060 and memory 1085 coupled via system bus 1500. A memory of system 5000 in one embodiment can include the memories 1085 each of terminal 1000, server 2000, and server 3000.

Referring to further aspects of terminal 1000, lens assembly 250 can be adapted for focusing an image of a document 110 located within a field of view 1240 on a substrate, T, onto image sensor array 1033. A size in target space of a field of view 1240 of terminal 1000 can be varied in a number of alternative ways. A size in target space of a field of view 1240 can be varied e.g. by changing a terminal to target distances, changing an imaging lens setting, changing a number of pixels of image sensor array 1033 that are subject to read out. Imaging light rays can be transmitted about imaging axis 25. Lens assembly 250 can be adapted to be capable of multiple focal lengths and multiple planes of optical focus (best focus distances).

Terminal 1000 can include an illumination subsystem 800 for illumination of target, T, and projection of an illumination pattern 1260. Terminal 1000 can also be devoid of illumination subsystem 800. Illumination pattern 1260, in the embodiment shown can be projected to be proximate to but larger than an area defined by field of view 1240, but can also be projected in an area smaller than an area defined by a field of view 1240.

In one embodiment, illumination subsystem 800 can also include an illumination lens assembly 300, as is shown in the embodiment of FIG. 3. In addition to or in place of illumination lens assembly 300 illumination subsystem 800 can include alternative light shaping optics, e.g., one or more diffusers, mirrors, and prisms. In use, terminal 1000 can be oriented by an operator with respect to a target, T, (e.g., a document, a package, another type of substrate) bearing decodable indicia 120 in such manner that illumination pattern 1260 is projected on a decodable indicia 120. In the example of FIG. 7, decodable indicia 120 is provided by a document that bears a 1D bar code symbol. Decodable indicia 120 could also be provided by a 2D bar code symbol or optical character recognition (OCR) characters. Referring to further aspects of terminal 1000, lens assembly 250 can be controlled with use of electrical power input unit 1202 which provides energy for changing a plane of optimum focus of lens assembly 250. In one embodiment, an electrical power input unit 1202 can operate as a controlled voltage source, and in another embodiment, as a controlled current source. Illumination pattern light source assembly 500 can be controlled with use of light source control circuit 1206. Electrical power input unit 1202 can apply signals for changing optical characteristics of lens assembly 250, e.g., for changing a focal length and/or a best focus distance of (a plane of optimum focus of) lens assembly 250. Light source control circuit 1206 can send signals to illumination pattern light source assembly 500, e.g., for changing a level of illumination output by illumination pattern light source assembly 500. Certain elements of terminal 1000, e.g., image sensor integrated circuit 1040 (and accordingly array 1033), imaging lens 200 and illumination subsystem 800 can be packaged into an imaging module 400 which can be incorporated into hand held housing 1014.

Terminal 1000 can also include a number of peripheral devices including trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). CPU 1060 can be operational to subject one or more of the succession of frames to a decode attempt.

For attempting to decode a bar code symbol, e.g., a one dimensional bar code symbol, a CPU of system 5000 (e.g., CPU 1060 of terminal 1000) can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

In the described example, system 5000 can attempt to decode a bar code symbol utilizing pixel values of fixed positions within boundaries of coordinated positions $p(x_e, y_e)$; $p(x_f, y_f)$; $p(x_g, y_g)$; $p(x_h, y_h)$.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank control circuit 1206 to system bus 1500, and interface circuit 1120 for coupling trigger 1220 to system bus 1500. Terminal 1000 can also include a display 1222 coupled to system bus 1500 and in communication with CPU 1060, via interface 1122, as well as pointer mechanism 1224 in communication with CPU 1060 via interface 1124 connected to system bus 1500. Terminal 1000 can also include keyboard 1226 coupled to system bus 1500. Keyboard 1226 can be in communication with CPU 1060 via interface 1126 connected to system bus 1500. Terminal 1000 can also include range detector unit 1208 coupled to system bus 1500 via interface 1108.

A succession of frames of image data that can be captured and subject to the described processing can be full frames (including pixel values corresponding to each pixel of image sensor array 1033 or a maximum number of pixels read out from array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames. A full frame can be captured by selectively addressing for read out pixels of image sensor 1032 having image sensor array 1033 corresponding to the full frame. A windowed frame can be captured by selectively addressing for read out pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

A physical form view of terminal 1000 in one embodiment is shown in FIG. 1. Trigger 1220, display 1222, pointer mechanism 1224, and keyboard 1226 can be disposed on a common side of a hand held housing 1014 as shown in FIG. 1. Display 1222, pointer mechanism 1224, and keyboard 1226 in one embodiment can be regarded as a user interface of terminal 1000. Display 1222 in one embodiment can incorporate a touch panel for navigation and virtual actuator selection in which case a user interface of terminal 1000 can be provided by display 1222. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor.

The image processing steps described herein can be distributed between terminal 1000, servers 2000 and/or 3000 and one embodiment can be executed entirely by terminal 1000. In such an embodiment, system 5000 can be regarded as being provided by terminal 1000.

In one embodiment, transformation of a frame to correct distribution and orientation can be expected to consume more processing time for a certain CPU relative to the processing for determining a location of a feature representation or processing for attempting to decode a bar code.

In one embodiment, system 5000 can be configured so that steps involved in processing of a frame are divided between terminal 1000 and an external server, e.g., server 2000 and/or 3000. The timing diagram of FIG. 8 illustrates an exemplary division of labor between processing carried out relative to a frame between a CPU 1060 of terminal 1000 and a CPU 1060 of an external server, e.g., server 2000 and/or 3000.

Figure 8:
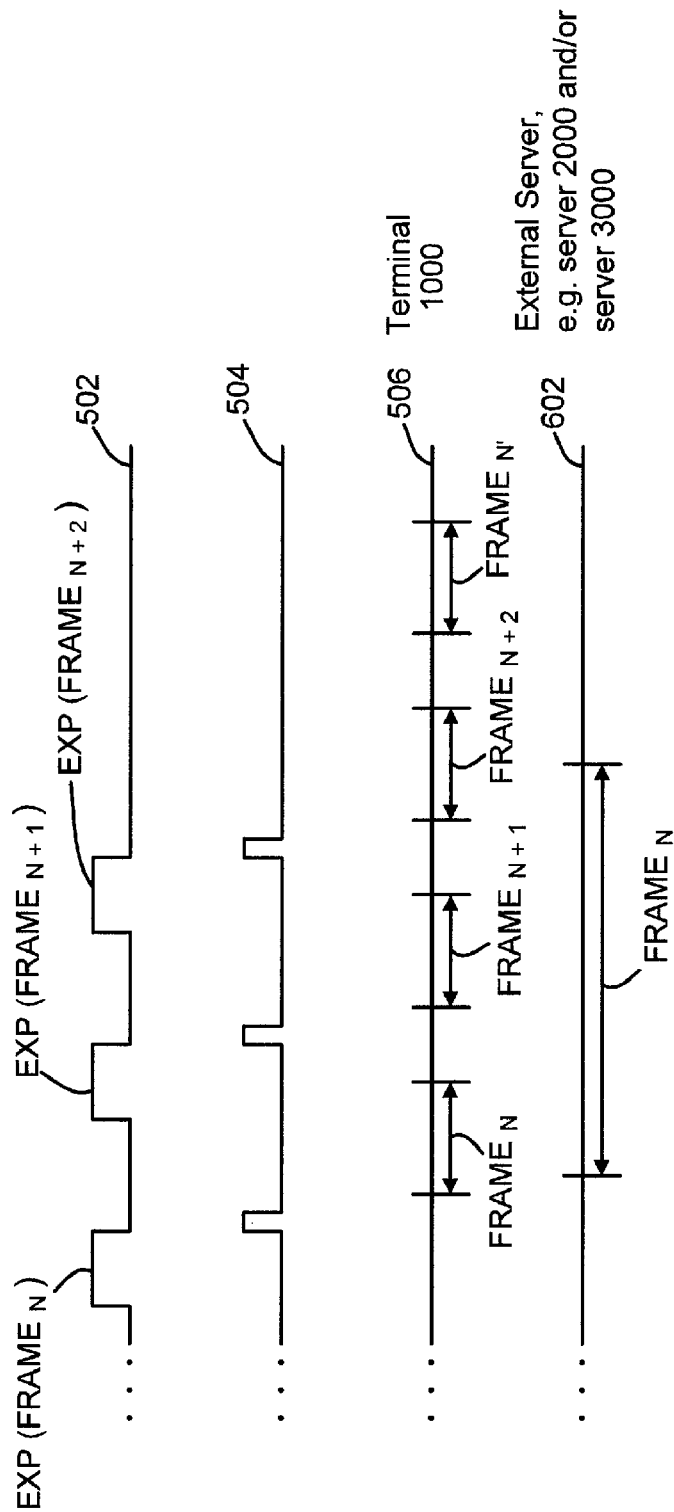
FIG. 8 is a timing diagram illustrating a method that can be carried out by a system.

Referring to the timing diagram of FIG. 8, timeline 502 illustrates exposure periods for a succession of frames, frame$_N$, frame$_{N+1}$, frame$_{N+2}$, timeline 504 illustrates readout pulses for a succession of frames, and timeline 506 illustrative processing periods of CPU 1060 for processing of respective frames, i.e., frame$_N$, frame$_{N+1}$, frame$_{N+2}$. Further referring to the timing diagram of FIG. 8, timeline 602 indicates a processing period of CPU 1060 of an external server of system 5000. In the division of labor depicted in FIG. 8, CPU 1060 can be dedicated for document feature location processing and/or bar code decoding processing as set forth herein for a certain frame, while CPU 1060 of an external server e.g., server 2000 and/or 3000 can be dedicated for performance of transformation processing for output of a transformed, distortion, corrected, and/or orientation corrected and/or cropped frame. Accordingly, transformation processing will not slow or restrict decoding processing by CPU 1060 of terminal 1000. For providing processing as depicted in the timing diagram of FIG. 8, a captured frame can be transmitted to an external server, e.g., server 2000 and/or 3000 for processing prior to or subsequent to processing of the frame being completed by CPU 1060 of terminal 1000. Referring to FIG. 8, it can be seen that an external server, e.g., server 2000 and/or 3000 can be transforming a certain frame, e.g., processing a certain frame for distortion correction, and/or orientation correction, and/or cropping, e.g., frame$_N$, while (during a time period that) CPU 1060 of terminal 1000 can be processing the certain frame, frame$_N$ for attempting to decode a bar code symbol. In another aspect, by the described processing of FIG. 8, an external server, e.g., server 2000 and/or 3000 can be processing a certain frame, frame$_N$ for distortion and/or orientation correction and/or cropping at a time that a CPU 1060 of terminal 1000 is exposing a subsequent frame, frame$_{N+1}$, frame$_{N+2}$.

In another aspect, it is seen that by the described processing a CPU 1060 of external server e.g., server 2000 and/or 3000 can be transforming a certain frame, frame$_N$ at a time when CPU 1060 of terminal 1000 is processing a subsequent frame, e.g., frame$_{N+1}$, frame$_{N+2}$ for attempting to decode a bar code symbol.

In one aspect the processing of server 2000 and/or 3000 for processing for distortion and/or orientation correction and/or cropping can be responsive to a receipt of the transmitted frame from terminal 1000. In one aspect system 5000 can be operative so that in response to an external server e.g., server 2000 and/or 3000 completing processing of the frame of distortion correction and/or orientation correction and/or cropping, the external server e.g., server 2000 and/or 3000 can transmit the transformed (e.g., distortion corrected, and/or orientation corrected and/or cropped) frame to terminal 1000. System 5000 can be further operative so that in response to the receipt of the transformed frame transmitted to the terminal 1000 from the external server e.g., server 2000 and/or 3000, terminal 1000 can subject the transformed (e.g., distortion corrected and or orientation corrected and/or cropped frame) to further processing. Such further processing by terminal 1000 can include, e.g., processing to attempt to decode a bar code symbol represented in the transformed frame. As indicated by timeline 506, terminal 1000 can subject the transformed frame version of frame$_N$ transmitted by the external server e.g., server 2000 and/or 3000 during the processing period designated "frame$_N$" in FIG. 8.

A small sample of systems methods and apparatus that are described herein is as follows:

A1. A system for use in reading a bar code symbol disposed on a document;

a terminal having an image sensor array comprising a plurality of pixels, the terminal having a lens assembly for use in focusing an image onto the two dimensional image sensor array, and a hand held housing incorporating the image sensor array, wherein the terminal is operative for capture of a frame of image data responsively to an initiation of a trigger signal by an operator, the frame of image data having a representation of the document, and further having a representation of the bar code symbol;
    a memory;
    pre-stored information respecting a known document type stored in the memory, the known document type having an associated bar code symbol, the pre-stored information including information respecting a bar code symbol position within a document of the known document type;
    wherein the system is operative for locating a document feature representation within the representation of the document, the document feature representation corresponding to a document feature other than the bar code symbol;
    wherein the system is further operative for utilizing the location of the document feature representation determined by the system and the pre-stored information to determine the location of a bar code symbol representation in the frame, the bar code symbol representation corresponding to the bar code symbol; and
    wherein the system is further operative to utilize image data of the determined location of the bar code symbol representation for attempting to decode the bar code symbol.

A2. The system of A1, wherein the frame of image data is verbatim the frame of image data subject to processing for determining a location of a feature representation.

A3. The system of A1, wherein the document feature representation is a text block representation.

A4. The system of A1, wherein the document feature representation is a text block representation, and wherein the system locates the text block representation by way of a process including calculating auto-correlation scores for a plurality of sampling paths.

A5. The system of A1, wherein the system includes the terminal and at least one server external to the terminal and wherein the terminal is operative for attempting to decode the bar code symbol.

A6. The system of A1, wherein the system is further operative for outputting a transformed representation of the document, the transformed representation correcting for distortion in the frame of image data.

A7. The system of A1, wherein the feature representation is at least one edge of the document.

A8. The system of A1, wherein the system includes an external server external to the terminal, and wherein the external server is operative to receive the frame from the terminal and subject the frame to distortion correction processing in which there is corrected distortion resulting from an imaging axis of the terminal being at a non-perpendicular angle relative to the document during capture.

A9. The system of A8, wherein the external server is operative to subject the frame to distortion correction during a time period that the terminal subjects the frame to an attempt to decode a bar code symbol.

A10. The system of A8, wherein the external server is operative to subject the frame to distortion correction during a time period that the terminal subjects a subsequent frame to an attempt to decode a bar code symbol.

B1. A system for use in reading a bar code symbol disposed on a substrate;
    a terminal having an image sensor array comprising a plurality of pixels, the terminal having a lens assembly for use in focusing an image onto the two dimensional image sensor array, and a hand held housing incorporating the image sensor array, wherein the terminal is operative for capture of a frame of image data responsively to an initiation of a trigger signal by an operator, the frame of image data having a representation of the substrate, and further having a representation of the bar code symbol;
    an external server external to the terminal;
    wherein the terminal is operative to transmit the frame to the external server;
    wherein the terminal is further operative to subject the frame to an attempt to decode a bar code symbol with the frame being in a state in which distortion of the frame attributable to an imaging axis of the terminal being at a non-perpendicular angle relative to the substrate during capture of the frame is not corrected;
    wherein the external server is operative to receive the frame and subject the frame to distortion correction processing in which there is corrected distortion resulting from an imaging axis of the terminal being at a non-perpendicular angle relative to the document during capture.

B2. The system of B1, wherein the external server is operative to subject the frame to distortion correction during a time period that the terminal subjects the frame to an attempt to decode a bar code symbol with the frame being in the state in which distortion of the frame attributable to an imaging axis of the terminal being at a non-perpendicular angle relative to the substrate during capture of the frame is not corrected.

B3. The system of B1, wherein the external server is operative to subject the frame to distortion correction during a time period that the terminal subjects a subsequent frame to an attempt to decode a bar code symbol.

B4. The system of B1, wherein the external server is further operative to transmit the frame in a distortion corrected state to the terminal after subjecting the frame to distortion correction processing in which there is corrected distortion resulting from an imaging axis of the terminal being at a non-perpendicular angle relative to the document during capture.

B5. The system of B4, wherein the terminal is further operative to attempt to decode a bar code symbol utilizing the frame in a distortion corrected state responsively to receiving of the frame in a distortion corrected state from the external server.

B6. The system of B1, wherein the external server is a local server.

B7. The system of B1, wherein the external server is a remote server.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A system for use in reading a bar code symbol disposed on a document;
    a terminal having an image sensor array comprising a plurality of pixels, the terminal having a lens assembly for use in focusing an image onto the two dimensional image sensor array, and a hand held housing incorporating the image sensor array, wherein the terminal is operative for capture of a frame of image data responsively to an initiation of a trigger signal by an operator, the frame of image data having a representation of the document, and further having a representation of the bar code symbol;

a memory;

pre-stored information respecting one or more document types stored in the memory, each document type having an associated bar code symbol, the pre-stored information including information respecting a bar code symbol position within a document of a known document type;

wherein the system is operative for locating a document feature representation within the representation of the document, the document feature representation corresponding to a document feature other than the bar code symbol;

wherein the system is further operative for determining a document type based on the document feature representation;

wherein the system is further operative for utilizing the location of the document feature representation determined by the system and the pre-stored information corresponding to the document type to determine the location of a bar code symbol representation in the frame, the bar code symbol representation corresponding to the bar code symbol; and wherein the system is further operative to utilize image data of the determined location of the bar code symbol representation for attempting to decode the bar code symbol.

2. The system of claim 1, wherein the frame of image data is verbatim the frame of image data subject to processing for determining a location of a feature representation.

3. The system of claim 1, wherein the document feature representation is a text block representation.

4. The system of claim 1, wherein the document feature representation is a text block representation, and wherein the system locates the text block representation by way of a process including calculating auto-correlation scores for a plurality of sampling paths.

5. The system of claim 1, wherein the system includes the terminal and at least one server external to the terminal and wherein the terminal is operative for attempting to decode the bar code symbol.

6. The system of claim 1, wherein the system is further operative for outputting a transformed representation of the document, the transformed representation correcting for distortion in the frame of image data.

7. The system of claim 1, wherein the feature representation is at least one edge of the document.

8. The system of claim 1, wherein the system includes an external server external to the terminal, and wherein the external server is operative to receive the frame from the terminal and subject the frame to distortion correction processing in which there is corrected distortion resulting from an imaging axis of the terminal being at a non-perpendicular angle relative to the document during capture.

9. The system of claim 8, wherein the external server is operative to subject the frame to distortion correction during a time period that the terminal subjects the frame to an attempt to decode a bar code symbol.

10. The system of claim 8, wherein the external server is operative to subject the frame to distortion correction during a time period that the terminal subjects a subsequent frame to an attempt to decode a bar code symbol.

11. A system for use in reading a bar code symbol disposed on a substrate;

a terminal having an image sensor array comprising a plurality of pixels, the terminal having a lens assembly for use in focusing an image onto the two dimensional image sensor array, and a hand held housing incorporating the image sensor array, wherein the terminal is operative for capture of a frame of image data responsively to an initiation of a trigger signal by an operator, the frame of image data having a representation of the substrate, and further having a representation of the bar code symbol;

an external server external to the terminal;

wherein the terminal is operative to transmit the frame to the external server;

wherein the terminal is further operative to subject the frame to an attempt to decode a bar code symbol with the frame being in a state in which distortion of the frame attributable to an imaging axis of the terminal being at a non-perpendicular angle relative to the substrate during capture of the frame is not corrected;

wherein the external server is operative to receive the frame and subject the frame to distortion correction processing in which there is corrected distortion resulting from an imaging axis of the terminal being at a non-perpendicular angle relative to the document during capture.

12. The system of claim 11, wherein the external server is operative to subject the frame to distortion correction during a time period that the terminal subjects the frame to an attempt to decode a bar code symbol with the frame being in the state in which distortion of the frame attributable to an imaging axis of the terminal being at a non-perpendicular angle relative to the substrate during capture of the frame is not corrected.

13. The system of claim 11, wherein the external server is operative to subject the frame to distortion correction during a time period that the terminal subjects a subsequent frame to an attempt to decode a bar code symbol.

14. The system of claim 11, wherein the external server is further operative to transmit the frame in a distortion corrected state to the terminal after subjecting the frame to distortion correction processing in which there is corrected distortion resulting from an imaging axis of the terminal being at a non-perpendicular angle relative to the document during capture.

15. The system of claim 14, wherein the terminal is further operative to attempt to decode a bar code symbol utilizing the frame in a distortion corrected state responsively to receiving of the frame in a distortion corrected state from the external server.

16. The system of claim 11, wherein the external server is a local server.

17. The system of claim 11, wherein the external server is a remote server.

* * * * *